ic matrix is configured for weighting amplitudes of and adjusting phases of the beam vectors in the first-stage pre-coding matrix; and the user equipment transmits the first pre-coding indication information and the second pre-coding indication information to a network side device.

(12) United States Patent
Li et al.

(10) Patent No.: US 10,879,971 B2
(45) Date of Patent: Dec. 29, 2020

(54) METHODS AND APPARATUSES FOR TRANSMITTING PRE-CODING INDICATION INFORMATION AND DETERMINING PRE-CODING MATRIX

(71) Applicant: China Academy of Telecommunications Technology, Beijing (CN)

(72) Inventors: Hui Li, Beijing (CN); Qiubin Gao, Beijing (CN); Runhua Chen, Beijing (CN); Wenhong Chen, Beijing (CN); Tamrakar Rakesh, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 414 days.

(21) Appl. No.: 15/754,954

(22) PCT Filed: Jul. 14, 2016

(86) PCT No.: PCT/CN2016/090079
§ 371 (c)(1),
(2) Date: Feb. 23, 2018

(87) PCT Pub. No.: WO2017/032181
PCT Pub. Date: Mar. 2, 2017

(65) Prior Publication Data
US 2020/0244322 A1    Jul. 30, 2020

(30) Foreign Application Priority Data
Aug. 24, 2015   (CN) .......................... 2015 1 0524819

(51) Int. Cl.
*H04B 7/0456*   (2017.01)
*H04B 7/06*     (2006.01)

(52) U.S. Cl.
CPC ......... *H04B 7/0469* (2013.01); *H04B 7/0478* (2013.01); *H04B 7/0634* (2013.01); *H04B 7/0639* (2013.01)

(58) Field of Classification Search
CPC .. H04B 7/0469; H04B 7/0634; H04B 7/0478; H04B 7/0639
See application file for complete search history.

(56) References Cited

U.S. PATENT DOCUMENTS

2012/0269290 A1* 10/2012 Onggosanusi .... H04L 25/03343
                                                       375/296
2013/0107920 A1   5/2013 Kim et al.

FOREIGN PATENT DOCUMENTS

CN        101909022 A    12/2010
CN        102195923 A    9/2011
(Continued)

OTHER PUBLICATIONS

3GPP TSG RAN WG1 Meeting #82, "Codebook structure for FD-MIMO", CATT, Beijing, China, Aug. 24-28, 2015.

*Primary Examiner* — Dady Chery
(74) *Attorney, Agent, or Firm* — Foley & Lardner LLP

(57) ABSTRACT

Disclosed are methods and apparatuses for transmitting coding indication information and determining a pre-coding matrix, for use in resolving the problem that the resolution of code words in a codebook generated by using a combination of a beam vector subgroup and column selection cannot be flexibly adjusted. The method comprises: user equipment determines first pre-coding indication information and second pre-coding indication information, the first pre-coding indication information corresponding to a first-stage pre-coding matrix, the first-stage pre-coding matrix comprising beam vectors in different polarizations, the second pre-coding indication information corresponding to a second-stage pre-coding matrix, the second-stage pre-cod-
(Continued)

ing matrix being used for performing amplitude weighting and phase adjusting on all beam vectors in each polarization in the first-stage pre-coding matrix, and the first-stage pre-coding matrix and the second-stage pre-coding matrix being used for generating a pre-coding matrix. Amplitude weighting and phase adjusting are performed on all beam vectors in each polarization in a first-stage pre-coding matrix, so that the resolution of a pre-coding matrix is flexibly adjusted, and the system performance is improved.

9 Claims, 3 Drawing Sheets

(56) References Cited

FOREIGN PATENT DOCUMENTS

| CN | 102299759 A | 12/2011 |
|---|---|---|
| CN | 103378882 A | 10/2013 |
| CN | 103780331 A | 5/2014 |
| CN | 103780332 A | 5/2014 |
| CN | 103795450 A | 5/2014 |
| CN | 105450273 A | 3/2016 |
| JP | 2013-533653 A | 8/2013 |
| KR | 10-2012-062597 B1 | 6/2012 |
| WO | WO-2015/018030 | 2/2015 |

* cited by examiner

METHODS AND APPARATUSES FOR TRANSMITTING PRE-CODING INDICATION INFORMATION AND DETERMINING PRE-CODING MATRIX

This application is a US National Stage of International Application No. PCT/CN2016/090079, filed on Jul. 14, 2016, designating the United States and claiming priority of Chinese Patent Application No. 201510524819.2, filed with the Chinese Patent Office on Aug. 24, 2015 and entitled "a method and apparatus for transmitting coding indication information, and a method and apparatus for determining a pre-coding matrix", the content of each of which is incorporated by reference in its entirety.

FIELD

The present disclosure relates to the field of communications, and particularly to a method and apparatus for transmitting pre-coding indication information, and a method and apparatus for determining a pre-coding matrix.

BACKGROUND

In a current Long Term Evolution (LTE) system, a pre-coding codebook is generally based upon Discrete Fourier Transform (DFT) vectors, and structured as a two-level codebook. Taking an 8-antenna codebook in Rel-12 as an example, a subset of DFT beam vectors are determined at a first level, and a terminal feeds an index of the subset of beam vectors among all subsets of subsets of beam vectors, i.e., a Pre-coding Matrix Indicator (PMI) 1, back to an evolved Node B (eNB); and one or several columns are selected from the subset of DFT beam vectors at a second level and perform phase adjustment between the two polarizations on the selected one or several columns, and the terminal feeds an index of the column selection and the phase adjustment among all possible combinations (i.e., a PMI2) back to the base station. The base station generates a final pre-coding matrix for transmitting downlink data according to the PMI1 and the PMI2 fed back at the two levels.

In the existing LTE system, resolution of a codeword in a codebook generated by column selection from a subset of DFT beam vectors is purely determined by pre-defined DFT beam vectors, so the resolution cannot be adjusted flexibly, thus degrading the performance of the system.

SUMMARY

Embodiments of the disclosure provide a method and apparatus for transmitting pre-coding indication information, and a method and apparatus for determining a pre-coding matrix, so as to address the problem of inability to adjust flexibly resolution of a codeword in a codebook generated by column selection from a subset of DFT beam vectors.

An embodiment of the disclosure provides a method for transmitting pre-coding indication information. The method includes the following operations: determining, by a User Equipment (UE), first pre-coding indication information and second pre-coding indication information, and transmitting, by the UE, the first pre-coding indication information and the second pre-coding indication information to a network side device. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of a pre-coding matrix.

In an implementation, determining, by the UE, the first pre-coding indication information and the second pre-coding indication information includes the following operations: selecting, by the UE, a first-level pre-coding matrix from a set of first-level pre-coding matrixes, and determining the first pre-coding indication information corresponding to the selected first-level pre-coding matrix; and selecting, by the UE, a second-level pre-coding matrix from a set of second-level pre-coding matrixes, and determining the second pre-coding indication information corresponding to the selected second-level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

In an implementation each second-level pre-coding matrix, $W_2$, in the set of second-level pre-coding matrixes is represented as:

$$W_2 = \begin{bmatrix} a_0^{(1+)}e^{j\theta_0^{(1+)}} & a_0^{(2+)}e^{j\theta_0^{(2+)}} & \cdots & a_0^{(R+)}e^{j\theta_0^{(R+)}} \\ a_1^{(1+)}e^{j\theta_1^{(1+)}} & a_1^{(2+)}e^{j\theta_1^{(2+)}} & \cdots & a_1^{(R+)}e^{j\theta_1^{(R+)}} \\ \vdots & \vdots & \vdots & \vdots \\ a_{M-1}^{(1+)}e^{j\theta_{M-1}^{(1+)}} & a_{M-1}^{(2+)}e^{j\theta_{M-1}^{(2+)}} & \cdots & a_{M-1}^{(R+)}e^{j\theta_{M-1}^{(R+)}} \\ \phi(1)a_0^{(1-)}e^{j\theta_0^{(1-)}} & \phi(2)a_0^{(2-)}e^{j\theta_0^{(2-)}} & \cdots & \phi(R)a_0^{(R-)}e^{j\theta_0^{(R-)}} \\ \phi(1)a_1^{(1-)}e^{j\theta_1^{(1-)}} & \phi(2)a_1^{(2-)}e^{j\theta_1^{(2-)}} & \cdots & \phi(R)a_1^{(R-)}e^{j\theta_1^{(R-)}} \\ \vdots & \vdots & \vdots & \vdots \\ \phi(1)a_{M-1}^{(1-)}e^{j\theta_{M-1}^{(1-)}} & \phi(2)a_{M-1}^{(2-)}e^{j\theta_{M-1}^{(2-)}} & \cdots & \phi(R)a_{M-1}^{(R-)}e^{j\theta_{M-1}^{(R-)}} \end{bmatrix}.$$

$\phi(\cdot)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)} = 1$ and $\Sigma_{l=0}^{M-1} a_l^{(r-)} = 1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. l=0, 1, 2, ..., M−1. M represents a quantity of beam vectors in each non-zero sub-matrix in the first-level pre-coding matrix. r=1, 2, ..., R. R represents a quantity of transmission streams.

In an implementation, antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \cdots & A_V^{(R+)} \otimes A_h^{(R+)} \\ \phi(1)\cdot(A_V^{(1-)} \otimes A_h^{(1-)}) & \phi(2)\cdot(A_V^{(2-)} \otimes A_h^{(2-)}) & \cdots & \phi(R)\cdot(A_V^{(R-)} \otimes A_h^{(R-)}) \end{bmatrix}.$$

-continued $$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

$$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and }$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}. \ a_{v,l_v}^{(r+)} \text{ and } a_{v,l_v}^{(r-)}$$

represent amplitude weighting factors of an $l_v$-th beam vector in a vertical dimension of each polarization of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)} = 1$ and $\Sigma_{l=0}^{M_v-1} a_{v,l_v}^{(r-)} = 1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l_v=0, 1, 2, \ldots, M_v-1$. $M_v$ represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $\theta_{h,l_h}^{(r+)}$ and $a_{h,l_h}^{(r-)}$ are real values within a range from 0 to 1. $\Sigma_{l=0}^{M_h-1} a_{h,l_h}^{(r+)} = 1$ and $\Sigma_{l=0}^{M_h-1} a_{h,l_h}^{(r-)} = 1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

The embodiment of the disclosure further provides a method for determining a pre-coding matrix, the method including the following operations: receiving, by a network side device, first pre-coding indication information and second pre-coding indication information transmitted by a UE; and determining, by the network side device, the pre-coding matrix according to the first pre-coding indication information and the second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of the pre-coding matrix.

In an implementation, determining, by the network side, the pre-coding matrix includes the following operations: determining, by the network side device, a first-level pre-coding matrix corresponding to the first pre-coding indication information from a set of first-level pre-coding matrixes; determining, by the network side device, a second-level pre-coding matrix corresponding to the second pre-coding indication information from a set of second-level pre-coding matrixes; and determining, by the network side device, the pre-coding matrix by multiplying the determined first-level pre-coding matrix and the determined second level pre-coding matrix. Each first-level pre-coding matrix is a block diagonal matrix, each non-zero sub-matrix in each first-level pre-coding matrix represents a different polarization, each non-zero sub-matrix includes M beam vectors, and M is a positive integer.

In an implementation, each second-level pre-coding matrix, $W_2$, in the set of second-level pre-coding matrixes is represented as:

$$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\bullet)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)} = 1$ and $\Sigma_{l=0}^{M-1} a_l^{(r-)} = 1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission streams.

In an implementation, antenna ports of the UE are two-dimension antenna ports, and each second-level pre-coding matrix, $W_2$, in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix}.$$

-continued $$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

$$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and}$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}. \; a_{v,l_v}^{(r+)} \text{ and } a_{v,l_v}^{(r-)}$$

represent amplitude weighting factors of an $l_v$-th beam vector in a vertical dimension of each polarization) of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)}=1$ and $\Sigma_{l=0}^{M_v-1} a_{v,l_v}^{(r-)}=1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l_v=0, 1, 2, \ldots, M_v-1$. $M_v$ represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ are real values within a range from 0 to 1. $\Sigma_{l=0}^{M_h-1} a_{h,l_h}^{(r+)}=1$ and $\Sigma_{l=0}^{M_h-1} a_{h,l_h}^{(r-)}=1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

The embodiment of the disclosure also provides an apparatus for transmitting pre-coding indication information. The apparatus includes: a determining module configured to determine first pre-coding indication information and second pre-coding indication information; and a transmitting module configured to transmit the first pre-coding indication information and the second pre-coding indication information to a network side device. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of a pre-coding matrix.

In an implementation, the determining module is further configured to: select a first-level pre-coding matrix from a set of first-level pre-coding matrixes, and determine the first pre-coding indication information corresponding to the selected first-level pre-coding matrix; select a second-level pre-coding matrix from a set of second-level pre-coding matrixes, and determine the second pre-coding indication information corresponding to the selected second-level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

In an implementation, each second-level pre-coding matrix, $W_2$, in the set of second-level pre-coding matrixes is represented as:

$$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\cdot)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)}=1$ and $\Sigma_{l=0}^{M-1} a_l^{(r-)}=1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission streams.

In an implementation, antenna ports of the apparatus are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix}.$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

-continued $$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and }$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}. \; a_{v,l_v}^{(r+)} \text{ and } a_{v,l_v}^{(r-)}$$

represent amplitude weighting factors of an $l_v$-th beam vector in a vertical dimension of each polarization (of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)}=1$ and $\Sigma_{l=0}^{M_v-1} a_{v,l_v}^{(r-)}=1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l_v=0, 1, 2, \ldots, M_v-1$. $M_v$ represents a quantity of beam vectors in the vertical dimension. $a_{h,l_h}^{(r+)}$ h and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ are real values within a range from 0 to 1. $\Sigma_{l=0}^{M_h-1} a_{h,l_h}^{(r+)}=1$ and $\Sigma_{l=0}^{M_h-1} a_{h,l_h}^{(r-)}=1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

The embodiment of the disclosure also provides an apparatus for determining a pre-coding matrix. The apparatus includes: a receiving module configured to receive first pre-coding indication information and second pre-coding indication information transmitted by a UE; and a processing module configured to determine the pre-coding matrix according to the first pre-coding indication information and the second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of the pre-coding matrix.

In an implementation, the processing module is further configured to: determine a first-level pre-coding matrix corresponding to the first pre-coding indication information from a set of first-level pre-coding matrixes; determine a second-level pre-coding matrix corresponding to the second pre-coding indication information from a set of second-level pre-coding matrixes; and determine the pre-coding matrix by multiplying the determined first-level pre-coding matrix and the determined second level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

In an implementation, each second-level pre-coding matrix, $W_2$, in the set of second-level pre-coding matrixes is represented as:

$$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\cdot)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)}=1$ and $\Sigma_{l=0}^{M-1} a_l^{(r-)}=1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission streams.

In an implementation, antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix}.$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

-continued $$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and}$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}. \quad a_{v,l_v}^{(r+)} \text{ and } a_{v,l_v}^{(r-)}$$

represent amplitude weighting factors of an $l_v$-th beam vector in a vertical dimension of each polarization of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)}=1$ and $\Sigma_{l=0}^{M_v-1} a_{v,l_v}^{(r-)}=1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l_v=0, 1, 2, \ldots, M_v-1$. M represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ are real values within a range from 0 to 1. $\Sigma_{l=0}^{M_h-1} a_{h,l_h}^{(r+)}=1$ and $\Sigma_{l=0}^{M_h-1} a_{h,l_h}^{(r-)}=1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

The embodiment of the disclosure further provides a UE. The UE includes a transceiver and at least one processor connected with the transceiver. The at least one processor is configured to read a program in a memory to perform the following operation: determining first pre-coding indication information and second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of a pre-coding matrix.

The transceiver is configured to be controlled by the at least one processor to transmit the first pre-coding indication information and the second pre-coding indication information to a network side device.

In an implementation, the at least one processor is further configured to perform the following operations: selecting a first-level pre-coding matrix from a set of first-level pre-coding matrixes, and determining the first pre-coding indication information corresponding to the selected first-level pre-coding matrix; selecting a second-level pre-coding matrix from a set of second-level pre-coding matrixes, and determining the second pre-coding indication information corresponding to the selected second-level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

In an implementation, each second-level pre-coding matrix, $W_2$, in the set of second-level pre-coding matrixes is represented as $$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\bullet)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)}=1$ and $\Sigma_{l=0}^{M-1} a_l^{(r-)}=1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission streams.

In an implementation, antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix}.$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

-continued $$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and}$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}. \quad a_{v,l_v}^{(r+)} \text{ and } a_{v,l_v}^{(r-)}$$

represent amplitude weighting factors of an $l_v$-th beam vector in a vertical dimension of each polarization of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)}=1$ and $\Sigma_{l=0}^{M_v-1} a_{v,l_v}^{(r-)}=1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l_v=0, 1, 2, \ldots, M_v-1$. M represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ are real values within a range from 0 to 1. $\Sigma_{l=0}^{M_h-1} a_{h,l_h}^{(r+)}=1$ and $\Sigma_{l=0}^{M_h-1} a_{h,l_h}^{(r-)}=1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

The embodiment of the disclosure further provides a base station. The base station includes a transceiver and at least one processor connected with the transceiver. The at least one processor is configured to read a program in a memory to perform the following operation: receiving first pre-coding indication information and second pre-coding indication information transmitted by a UE through the transceiver; and determining the pre-coding matrix according to the first pre-coding indication information and the second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of the pre-coding matrix.

In an implementation, the at least one processor is further configured to perform the following operations: determining a first-level pre-coding matrix corresponding to the first pre-coding indication information from a set of first-level pre-coding matrixes; determining a second-level pre-coding matrix corresponding to the second pre-coding indication information from a set of second-level pre-coding matrixes; and determining the pre-coding matrix by multiplying the determined first-level pre-coding matrix and the determined second level pre-coding matrix. Each first-level pre-coding matrix is a block diagonal matrix, each non-zero sub-matrix in each first-level pre-coding matrix represents a different polarization, each non-zero sub-matrix includes M beam vectors, and M is a positive integer.

In an implementation, each second-level pre-coding matrix, $W_2$, in the set of second-level pre-coding matrixes is represented as:

$$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\cdot)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)}=1$ and $\Sigma_{l=0}^{M-1} a_l^{(r-)}=1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission stream.

In an implementation, antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix}.$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

-continued $$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and}$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}. \quad a_{v,l_v}^{(r+)} \text{ and } a_{v,l_v}^{(r-)}$$

represent amplitude weighting factors of an $l_v$-th beam vector in a vertical dimension of each polarization of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)} = 1$ and $\Sigma_{l=0}^{M_v-1} a_{v,l_v}^{(r-)} = 1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l=0, 1, 2, \ldots, M_v-1$. M represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ are real values within a range from 0 to 1. $\Sigma_{l=0}^{M_h-1} a_{h,l_h}^{(r+)} = 1$ and $\Sigma_{l=0}^{M_h-1} a_{h,l_h}^{(r-)} = 1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_vM_h$. $r=1, 2, \ldots, R$. R represents the quantity of transmission streams.

The pre-coding matrix according to the embodiment of the disclosure is a product of the first-level pre-coding matrix and the second-level pre-coding matrix, where the second-level pre-coding matrix is configured to weight amplitudes of and adjust phases of all the beam vectors in the first-level pre-coding matrix. A rough orientation of the UE is determined according to the beam vectors in the first-level pre-coding matrix without linear weighting so as to reduce feedback overheads of the system. Amplitude weighting and phase adjustment is performed on the beam vectors having different polarizations in the first-level pre-coding matrix through linear weighting according to the second-level pre-coding matrix, so that the beam vectors point to a precise orientation of the UE. In this way, resolution of the pre-coding matrix can be adjusted flexibly by using the second-level pre-coding matrix to obtain a high-resolution pre-coding matrix and improve the performance of the system.

DETAILED DESCRIPTION OF AN EMBODIMENT

In a multi-antenna system based upon linear pre-coding, a receiver selects an appropriate pre-coding matrix from a pre-defined set consisting of pre-coding matrixes according to channel information, and feeds an index corresponding to the selected pre-coding matrix back to a transmitter, where the set is referred to as a codebook. The transmitter determines the corresponding pre-coding matrix according to the received index, and preprocesses a signal to be transmitted appropriately by using the determined pre-coding matrix, so as to improve validity and reliability of information transmission. The codebook is an indispensable element for performing this process. The codebook needs to be designed to match distribution characteristics of a channel and minimize a performance loss arising from quantization of the channel using the codebook as much as possible. The embodiment of the disclosure provides a method for generating a codebook through linear weighting in the presence of a multiple input multiple output (MIMO) channel, so as to address the problem of inability to adjust flexibly resolution of a codeword in a codebook generated by column selection from a subset of DFT beam vectors.

The embodiment of the disclosure is described below in further details with reference to the drawings. It shall be appreciated that the embodiment herein is merely intended to illustrate and explain the disclosure, but not to limit the disclosure.

Figure 1:
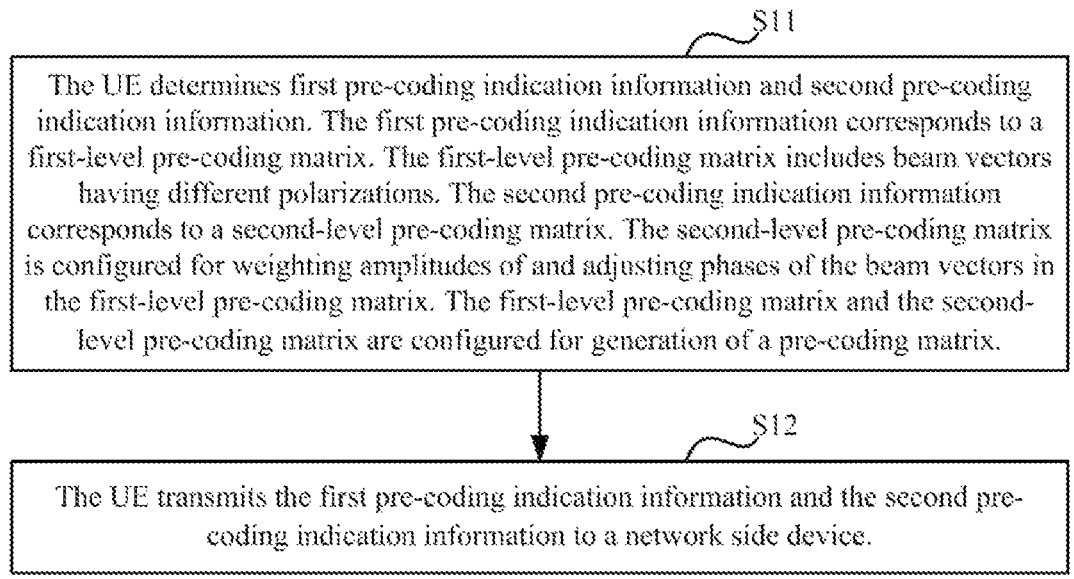
FIG. 1 is a schematic flow chart of a method for transmitting pre-coding indication information according to an embodiment of the disclosure.

As illustrated in FIG. 1, the embodiment of the disclosure provides a method for transmitting pre-coding indication information at a UE side. The method includes the following operations.

S11: the UE determines first pre-coding indication information and second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of a pre-coding matrix.

S12: the UE transmits the first pre-coding indication information and the second pre-coding indication information to a network side device.

The pre-coding matrix according to the embodiment of the disclosure is a product of the first-level pre-coding matrix and the second-level pre-coding matrix, where the second-level pre-coding matrix is configured to weight amplitudes of and adjust phases of all the beam vectors in the first-level pre-coding matrix. A rough orientation of the UE is determined according to the beam vectors in the first-level pre-coding matrix without linear weighting so as to reduce feedback overheads of the system. Amplitude weighting and phase adjustment is performed on the beam vectors having different polarizations in the first-level pre-coding matrix through linear weighting according to the second-level pre-coding matrix, so that the beam vectors point to a precise orientation of the UE. In this way, resolution of the pre-coding matrix can be adjusted flexibly by using the second-level pre-coding matrix to obtain a high-resolution pre-coding matrix and improve the performance of the system.

In an implementation, the operation S11 of determining, by the UE, the first pre-coding indication information and the second pre-coding indication information includes the following operations: selecting, by the UE, a first-level pre-coding matrix from a set of first-level pre-coding matrixes, and determining the first pre-coding indication information corresponding to the selected first-level pre-coding matrix; and selecting, by the UE, a second-level pre-coding matrix from a set of second-level pre-coding matrixes, and determining the second pre-coding indication information corresponding to the selected second-level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

In an implementation, the first pre-coding indication information is an index of the first-level pre-coding matrix selected by the UE in the set of first-level pre-coding matrixes, where the index is represented as a PMI1.

In an implementation, the second pre-coding indication information is an index of the second-level pre-coding matrix selected by the UE in the set of second-level pre-coding matrixes, where the index is represented as a PMI2.

In the embodiment of the disclosure, a quantity first-level pre-coding matrixes included by the set of first-level pre-coding matrixes is S. Each first-level pre-coding matrix is a block diagonal matrix. Each non-zero sub-matrix in each first-level pre-coding matrix represents a different polarization, and each non-zero sub-matrix includes M beam vectors. A part or none of beam vectors in two first-level pre-coding matrixes having adjacent indexes are the same. Both S and M are positive integers.

In an implementation, beam vectors in each non-zero sub-matrix in each first-level pre-coding matrix are M beam vectors among N predefined DFT beam vectors, and each of the N beam vectors points to an angle $\theta_i$, where i=0, 1, 2, ..., N-1. For an array of dually-polarized antennas, such a beam vector is used for the antenna ports of one polarization where an i-th beam vector is defined as:

$$V_i = \frac{1}{\sqrt{K}} \begin{bmatrix} 1 \\ e^{j\frac{2\pi}{N}i} \\ \vdots \\ e^{j\frac{2\pi}{N}(k-1)i} \\ \vdots \\ e^{j\frac{2\pi}{N}(K-1)i} \end{bmatrix}.$$

k=1, 2, ..., K, and K represents a quantity of ports corresponding to each polarization of antennas of the UE.

In an implementation the s-th first-level pre-coding matrix in the set of level pre-coding matrixes can be represented as $$W_1^{(s)} = \begin{bmatrix} X^{(s)} & 0 \\ 0 & X^{(s)} \end{bmatrix}, \text{ or } W_1^{(s)} = \begin{bmatrix} X^{(s)} & 0 \\ 0 & X^{(s)}B \end{bmatrix}.$$

Each non-zero sub-matrix (i.e., each block) $X^{(s)} = [V_{s \cdot N_p} V_{s \cdot N_p+1} \ldots V_{s \cdot N_p+M-1}]$, $X^{(s)}$ is a K×M dimensioned matrix, B is an M×M dimensioned diagonal matrix, and $N_p$ represents the quantity of different beam vectors among beam vectors in two first-level pre-coding matrixes with adjacent indexes (i.e., the quantity of non-overlapping beam vectors in the two adjacent first-level pre-coding matrixes). $1 \leq N_p \leq M$, and s=0, 1, 2, ..., S-1.

In an implementation, B can be a function of $X^{(s)}$, or each element of B can also has a fixed value.

In an implementation, an index of an m-th beam vector in the s-th first-level pre-coding matrix is: $s \cdot N_p + m$; where m=0, 1, 2, ..., M-1.

In an implementation, if $s \cdot N_p + m > N-1$, the index of the m-th beam vector in the s-th first-level pre-coding matrix is $\mod(s \cdot N_p + m, N-1) - 1$; where mod( ) represents a mod operation.

In an implementation, if antenna ports of the UE are two-dimension antenna ports, each beam vector in each first-level pre-coding matrix is a Kronecker product of beam vectors in a vertical dimension and beam vectors in a horizontal dimension. Each non-zero sub-matrix in each first-level pre-coding matrix is the Kronecker product of $M_v$ beam vectors in the vertical dimension and $M_h$ beam vectors in the horizontal dimension, where $M_v$ and $M_h$ are positive integers.

In an implementation, $N_v$ beam vectors are defined in the vertical dimension, $N_h$ beam vectors are defined in the horizontal dimension, and the total quantity of beam vectors is $N = N_v N_h$. Then the beam vectors in the vertical dimension are divided into groups each having $M_v$ beam vectors, and the beam vectors in the horizontal dimension are divided into groups each having $M_h$ beam vectors, so that $W_1$ includes $M = M_v M_h$ beam vectors and is represented as:

$$W_1 = \begin{bmatrix} X_v \otimes X_h & 0 \\ 0 & X_v \otimes X_h \end{bmatrix}; \text{ or}$$

$$W_1 = \begin{bmatrix} X_v \otimes X_h & 0 \\ 0 & (X_v B) \otimes X_h \end{bmatrix}; \text{ or}$$

$$W_1 = \begin{bmatrix} X_v \otimes X_h & 0 \\ 0 & X_v \otimes (X_h D) \end{bmatrix}; \text{ or}$$

-continued $$W_1 = \begin{bmatrix} X_v \otimes X_h & 0 \\ 0 & (X_v B) \otimes (X_h D) \end{bmatrix}.$$

The s-th group of beam vectors in the vertical dimension, $X_v = [V_{s \cdot N_{pv}}^v \ V_{s \cdot N_{pv}+1}^v \ \ldots \ V_{s \cdot N_{pv}+M_v-1}^v]$, and the s'-th group of beam vectors in the horizontal dimension, $X_h = [V_{s' \cdot N_{ph}}^h \ V_{s' \cdot N_{ph}+1}^h \ V_{s' \cdot N_{ph}+M_h-1}^h]$. A beam vector in the vertical dimension is represented as $$V_i^v = \frac{1}{\sqrt{K_v}} \begin{bmatrix} 1 \\ e^{j\frac{2\pi}{N_v}i} \\ \vdots \\ e^{j\frac{2\pi}{N_v}(k-1)i} \\ \vdots \\ e^{j\frac{2\pi}{N_v}(K_v-1)i} \end{bmatrix},$$

and a beam vector in the horizontal dimension is represented as $$V_i^h = \frac{1}{\sqrt{K_h}} \begin{bmatrix} 1 \\ e^{j\frac{2\pi}{N_h}i} \\ \vdots \\ e^{j\frac{2\pi}{N_h}(k-1)i} \\ \vdots \\ e^{j\frac{2\pi}{N_h}(K_h-1)i} \end{bmatrix}.$$

$N_{pv}$ represents the quantity of non-overlapping beam vectors in adjacent groups in the vertical dimension, and $N_{ph}$ represents the quantity of non-overlapping beam vectors in adjacent groups in the horizontal dimension. B is an $M_v \times M_v$ dimensioned diagonal matrix; and D is an $M_h \ M_h$ dimensioned diagonal matrix.

In an implementation B can be a function of $X_v$, or each element of B can also be a fixed value.

In an implementation D can be a function of $X_h$, or each element of D can also be a fixed value.

In an implementation, a second-level pre-coding matrix, $W_2$, in the set of second-level pre-coding matrixes is represented as:

$$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\cdot)$ represents phase adjustment factors of two polarizations. A possible value thereof is $\phi(r) \in \{e^{j\frac{2\pi t}{T}}, t = 0, 1, \ldots, T-1\}$. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ can be any real values within a range from 0 to 1 that satisfy $\Sigma_{l=0}^{M-1} a_l^{(r+)} = 1$ and $\Sigma_{l=0}^{M-1} a_l^{(r-)} = 1$, respectively. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ can be any number within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission streams.

In an implementation, antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix}.$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

$$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and}$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}. \ a_{v,l_v}^{(r+)} \text{ and } a_{v,l_v}^{(r-)}$$

represent amplitude weighting factors of an $l_v$-th beam vector in a vertical dimension of each polarization of the first-level pre-coding matrix. Values of $a_{v,l_v}^{(r+)}$ and $a_{v,l_v}^{(r-)}$ can be any real values within a range from 0 to 1 that satisfy $\Sigma_{l=0}^{M_v-1} a_{v,l_v}^{(r+)} = 1$ and $\Sigma_{l=0}^{M_v-1} a_{v,l_v}^{(r-)} = 1$, respectively. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ can be any numbers within a range from $-\pi$ to π. $l_v$=0, 1, 2, . . . , $M_v$–1. M represents a quantity of beam vectors in the vertical dimension $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ can be any real values within a range from 0 to 1 that satisfy $\Sigma_{l=0}^{M_h-1} a_{h,l_h}^{(r+)}=1$ and $\Sigma_{l=0}^{M_h-1} a_{h,l_h}^{(r-)}=1$, respectively. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ (can be any numbers within a range from –π to π. $l_h$=0, 1, 2, . . . , $M_h$–1. $M_h$ represents a quantity of beam vectors in the horizontal dimension. The quantity of beam vectors in each non-zero sub-matrix in the first-level pre-coding matrix is M=$M_v M_h$. r=1, 2, . . . , R. R represents the quantity of transmission streams.

Figure 2:
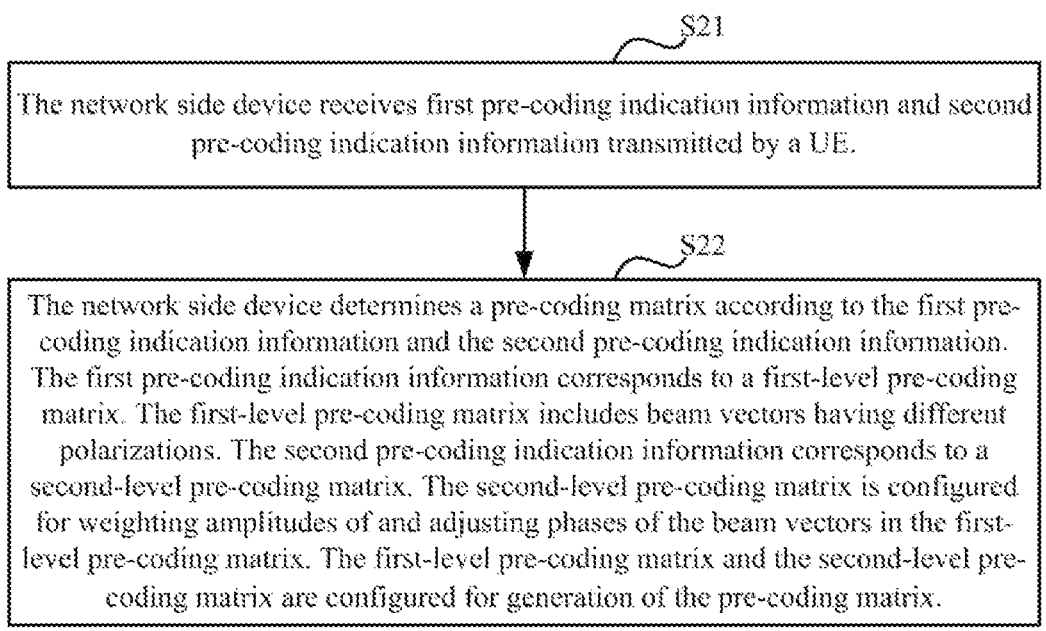
FIG. 2 is a schematic flow chart of a method for determining a pre-coding matrix according to the embodiment of the disclosure.

Based upon the same inventive conception, as illustrated in FIG. 2, the embodiment of the disclosure further provides a method for determining a pre-coding matrix at a network side device. The method includes the following operations.

S21. The network side device receives first pre-coding indication information and second pre-coding indication information transmitted by a UE.

S22. The network side device determines a pre-coding matrix according to the first pre-coding indication information and the second pre-coding indication information.

The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of the pre-coding matrix.

In an implementation, the network side device determines the pre-coding matrix according to the first pre-coding indication information and the second pre-coding indication information in S22 as follows.

The network side device determines a first-level pre-coding matrix corresponding to the first pre-coding indication information from a set of first-level pre-coding matrixes. Each first-level pre-coding matrix is a block diagonal matrix, each non-zero sub-matrix in the first-level pre-coding matrix represents a different polarization, and each non-zero sub-matrix includes M beam vectors. M is a positive integer. The network side device determines a second-level pre-coding matrix corresponding to the second pre-coding indication information from a second of first-level pre-coding matrixes. And the network side device uses a matrix composed of functions of the selected first-level pre-coding matrix, direction weighting vectors, and phase adjusting factors as the pre-coding matrix.

In an implementation, the first pre-coding indication information is an index of the first-level pre-coding matrix selected by the UE in the set of first-level pre-coding matrixes, where the index is represented as a PMI1.

In an implementation, the second pre-coding indication information is an index of the second-level pre-coding matrix selected by the UE in the set of second-level pre-coding matrixes, where the index is represented as a PMI2.

In an implementation, each second-level pre-coding matrix $W_2$ in the set of second-level pre-coding matrixes is represented as:

$$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\cdot)$ represents phase adjustment factors of two polarizations. A possible value thereof is $$\phi(r) \in \left\{ e^{j\frac{2\pi t}{T}}, t = 0, 1, \ldots, T-1 \right\}. \ a_l^{(r+)} \text{ and } a_l^{(r-)}$$

are amplitude weighting factors of an l-th beam vector in each polarization of a first-level pre-coding matrix. Values of $a_l^{(r+)}$ and $a_l^{(r-)}$ can be any real values within a range from 0 to 1 that satisfy $\Sigma_{l=0}^{M-1} a_l^{(r+)}=1$ and $\Sigma_{l=0}^{M-1} a_l^{(r-)}=1$, respectively. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ can be any number within a range from –π to π. l=0, 1, 2, . . . , M–1. M represents a quantity of beam vectors in each non-zero sub-matrix in the first-level pre-coding matrix. r=1, 2, . . . , R. R represents a quantity of transmission streams.

In an implementation, if antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix}.$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

$$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and}$$

-continued $$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}.$$

$a_{v,l_v}^{(r+)}$ and $a_{v,l_v}^{(r-)}$ represent amplitude weighting factors of an $l_v$-th beam vector in a vertical dimension of each polarization of the first-level pre-coding matrix. Values of $a_{v,l_v}^{(r+)}$ and $a_{v,l_v}^{(r-)}$ can be any real values within a range from 0 to 1 that satisfy $\Sigma_{l=0}^{M_v-1} a_{v,l_v}^{(r+)}=1$ and $\Sigma_{l=0}^{M_v-1} a_{v,l_v}^{(r-)}=1$, respectively. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ can be any numbers within a range from $-\pi$ to $\pi$. $l_v=0, 1, 2, \ldots, M_v-1$. M represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ can be any real values within a range from 0 to 1 that satisfy $\Sigma_{l=0}^{M_h-1} a_{h,l_h}^{(r+)}=1$ and $\Sigma_{l=0}^{M_h-1} a_{h,l_h}^{(r-)}=1$, respectively. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ can be any numbers within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

Based on any one of the above-mentioned embodiments, the network side device weights amplitudes of and adjust phases of the beam vectors in the first-level pre-coding matrix according to the second-level pre-coding matrix to obtain the final pre-coding matrix W. The pre-coding matrix determined by the network side device is:

$$W = \frac{1}{\sqrt{2 \cdot R}} \begin{bmatrix} Y_+^{(1)} & Y_+^{(2)} & \ldots & Y_+^{(R)} \\ \phi(1)Y_-^{(1)} & \phi(2)Y_-^{(2)} & \ldots & \phi(R)Y_-^{(R)} \end{bmatrix}.$$

$\phi(\cdot)$ represents phase adjustment factors of two polarizations. $Y_+^{(r)}$ and $Y_-^{(r)}$ represent pre-coding matrixes of different polarizations of a cross-polarized antenna at an r-th layer, where $r=1, 2, \ldots, R$. R represents a quantity of transmission streams.

The operations of the above-mentioned methods can be performed by using a software program. The software program can be stored in a storage medium, and when the stored software program is invoked, the above-mentioned operations are performed.

Based upon the same inventive conception, the embodiment of the disclosure further provides an apparatus for transmitting pre-coding indication information. Since the apparatus addresses the problem by using a principle similar to the principle used by the above-mentioned method for transmitting pre-coding indication information, reference can be made to the implementation of the method for an implementation of the apparatus, and a repeated description thereof is omitted here.

Figure 3:
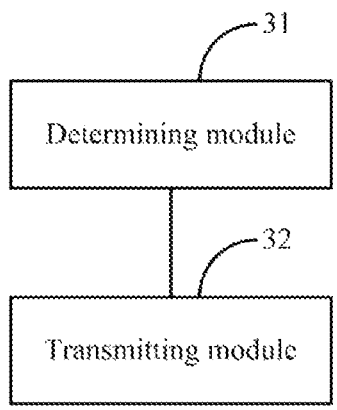
FIG. 3 is a schematic diagram of an apparatus for transmitting pre-coding indication information according to the embodiment of the disclosure.

As illustrated in FIG. 3, the embodiment of the disclosure further provides an apparatus for transmitting pre-coding indication information. The apparatus includes a determining module 31 configured to determine first pre-coding indication information and second pre-coding indication information and a transmitting module 32 configured to transmit the first pre-coding indication information and the second pre-coding indication information to a network side device. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of a pre-coding matrix.

In an implementation, the determining module 31 is further configured to: select a first-level pre-coding matrix from a set of first-level pre-coding matrixes, and determine the first pre-coding indication information corresponding to the selected first-level pre-coding matrix; select a second-level pre-coding matrix from a set of second-level pre-coding matrixes, and determine the second pre-coding indication information corresponding to the selected second-level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

In an implementation, each second-level pre-coding matrix, $W_2$, in the set of second-level pre-coding matrixes is represented as:

$$W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_0^{(1-)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\cdot)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)}=1$ and $\Sigma_{l=0}^{M-1} a_l^{(r-)}=1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission streams.

In an implementation, if antenna ports of the apparatus are two-dimension antenna ports, each second-level pre-coding matrix $W_2$ in the set of second-level pre-coding matrixes is represented as:

$$W_2 = \begin{bmatrix} A_v^{(1+)} \otimes A_h^{(1+)} & A_v^{(2+)} \otimes A_h^{(2+)} & \ldots & A_v^{(R+)} \otimes A_h^{(R+)} \\ \phi(1) \cdot (A_v^{(1-)} \otimes A_h^{(1-)}) & \phi(2) \cdot (A_v^{(2-)} \otimes A_h^{(2-)}) & \ldots & \phi(R) \cdot (A_v^{(R-)} \otimes A_h^{(R-)}) \end{bmatrix}$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

$$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and}$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}.$$

$a_{v,l_v}^{(r+)}$ and $a_{v,l_v}^{(r-)}$ represent amplitude weighting factors of an $l_v$-th beam vector in a vertical dimension of each polarization) of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)}=1$ and $\Sigma_{l=0}^{M_v-1} a_{v,l_v}^{(r-)}=1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l_v=0, 1, 2, \ldots, M_v-1$. M represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ are real values within a range from 0 to 1. $\Sigma_{l=0}^{M_h-1} a_{h,l_h}^{(r+)}=1$ and $\Sigma_{l=0}^{M_h-1} a_{h,l_h}^{(r-)}=1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

Based upon the same inventive conception, the embodiment of the disclosure further provides an apparatus for determining a pre-coding matrix. Since the apparatus addresses the problem by using a principle similar to the principle used by the above-mentioned method for determining a pre-coding matrix, reference can be made to the implementation of the method for an implementation of the apparatus, and a repeated description thereof is omitted here.

Figure 4:
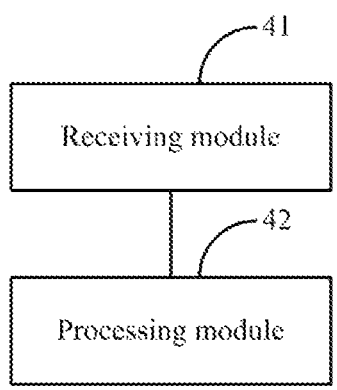
FIG. 4 is a schematic diagram of an apparatus for determining a pre-coding matrix according to the embodiment of the disclosure.

As illustrated in FIG. 4, the embodiment of the disclosure further provides an apparatus for determining a pre-coding matrix. The apparatus includes: a receiving module 41 configured to receive first pre-coding indication information and second pre-coding indication information transmitted by a UE; and a processing module 42 configured to determine the pre-coding matrix according to the first pre-coding indication information and the second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of the pre-coding matrix.

In an implementation, the processing module 42 is further configured to: determine a first-level pre-coding matrix corresponding to the first pre-coding indication information from a set of first-level pre-coding matrixes; determine a second-level pre-coding matrix corresponding to the second pre-coding indication information from a set of second-level pre-coding matrixes; and determine the pre-coding matrix by multiplying the determined first-level pre-coding matrix and the determined second level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

In an implementation, each second-level pre-coding matrix, $W_2$, in the set of second-level pre-coding matrixes is represented $$\text{as: } W_2 = \begin{bmatrix} a_0^{(1+)} e^{j\theta_0^{(1+)}} & a_0^{(2+)} e^{j\theta_0^{(2+)}} & \ldots & a_0^{(R+)} e^{j\theta_0^{(R+)}} \\ a_1^{(1+)} e^{j\theta_1^{(1+)}} & a_1^{(2+)} e^{j\theta_1^{(2+)}} & \ldots & a_1^{(R+)} e^{j\theta_1^{(R+)}} \\ \vdots & \vdots & \vdots & \vdots \\ a_{M-1}^{(1+)} e^{j\theta_{M-1}^{(1+)}} & a_{M-1}^{(2+)} e^{j\theta_{M-1}^{(2+)}} & \ldots & a_{M-1}^{(R+)} e^{j\theta_{M-1}^{(R+)}} \\ \phi(1) a_0^{(1-)} e^{j\theta_{M-1}^{(1+)}} & \phi(2) a_0^{(2-)} e^{j\theta_0^{(2-)}} & \ldots & \phi(R) a_0^{(R-)} e^{j\theta_0^{(R-)}} \\ \phi(1) a_1^{(1-)} e^{j\theta_1^{(1-)}} & \phi(2) a_1^{(2-)} e^{j\theta_1^{(2-)}} & \ldots & \phi(R) a_1^{(R-)} e^{j\theta_1^{(R-)}} \\ \vdots & \vdots & \vdots & \vdots \\ \phi(1) a_{M-1}^{(1-)} e^{j\theta_{M-1}^{(1-)}} & \phi(2) a_{M-1}^{(2-)} e^{j\theta_{M-1}^{(2-)}} & \ldots & \phi(R) a_{M-1}^{(R-)} e^{j\theta_{M-1}^{(R-)}} \end{bmatrix}.$$

$\phi(\bullet)$ represents phase adjustment factors of two polarizations. $a_l^{(r+)}$ and $a_l^{(r-)}$ are amplitude weighting factors of an l-th beam vector in each polarization of a first-level pre-coding matrix. Values of $a_l^{(r+)}$ and $a_l^{(r-)}$ are real values within a range from 0 to 1, $\Sigma_{l=0}^{M-1} a_l^{(r+)}=1$ and $\Sigma_{l=0}^{M-1} a_l^{(r-)}=1$. $\theta_l^{(r+)}$ and $\theta_l^{(r-)}$ represent phase adjusting factors of an l-th beam vector in each polarization of the first-level pre-coding matrix. Values of $\theta_l^{(r+)}$ and $\theta_l^{(r-)}$ are within a range from $-\pi$ to $\pi$. $l=0, 1, 2, \ldots, M-1$. M represents a quantity of beam vectors in each non-zero sub-matrix in the first-level pre-coding matrix. $r=1, 2, \ldots, R$. R represents a quantity of transmission streams.

In an implementation, antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \cdots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \cdots & \phi(R) \cdot (A_V^{(R-)} \otimes A_h^{(R-)}) \end{bmatrix}.$$

$$A_v^{(r+)} = \begin{bmatrix} a_{v,0}^{(r+)} e^{j\theta_{v,0}^{(r+)}} \\ a_{v,1}^{(r+)} e^{j\theta_{v,1}^{(r+)}} \\ \vdots \\ a_{v,M_v-1}^{(r+)} e^{j\theta_{v,M_v-1}^{(r+)}} \end{bmatrix},$$

$$A_h^{(r+)} = \begin{bmatrix} a_{h,0}^{(r+)} e^{j\theta_{h,0}^{(r+)}} \\ a_{h,1}^{(r+)} e^{j\theta_{h,1}^{(r+)}} \\ \vdots \\ a_{h,M_h-1}^{(r+)} e^{j\theta_{h,M_h-1}^{(r+)}} \end{bmatrix},$$

$$A_v^{(r-)} = \begin{bmatrix} a_{v,0}^{(r-)} e^{j\theta_{v,0}^{(r-)}} \\ a_{v,1}^{(r-)} e^{j\theta_{v,1}^{(r-)}} \\ \vdots \\ a_{v,M_v-1}^{(r-)} e^{j\theta_{v,M_v-1}^{(r-)}} \end{bmatrix} \text{ and }$$

$$A_h^{(r+)} = \begin{bmatrix} a_{h,0}^{(r-)} e^{j\theta_{h,0}^{(r-)}} \\ a_{h,1}^{(r-)} e^{j\theta_{h,1}^{(r-)}} \\ \vdots \\ a_{h,M_h-1}^{(r-)} e^{j\theta_{h,M_h-1}^{(r-)}} \end{bmatrix}.$$

$a_{v,l_v}^{(r+)}$ and $a_{v,l_v}^{(r-)}$ represent amplitude weighting factors of an $l_v$-th beam vector in a vertical dimension of each polarization of the first-level pre-coding matrix. Values of $a_{v,l_v}^{(r+)}$ and $a_{v,l_v}^{(r-)}$ are real values within a range from 0 to 1, $\Sigma_{l=0}^{M_v-1} a_{v,l_v}^{(r+)}=1$ and $\Sigma_{l=0}^{M_v-1} a_{v,l_v}^{(r-)}=1$. $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix. Values of $\theta_{v,l_v}^{(r+)}$ and $\theta_{v,l_v}^{(r-)}$ are within a range from $-\pi$ to $\pi$. $l_v=0, 1, 2, \ldots, M_v-1$. M represents a quantity of beam vectors in the vertical dimension. $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix. Values of $a_{h,l_h}^{(r+)}$ and $a_{h,l_h}^{(r-)}$ are real values within a range from 0 to 1. $\Sigma_{l=0}^{M_h-1} a_{h,l_h}^{(r+)}=1$ and $\Sigma_{l=0}^{M_h-1} a_{h,l_h}^{(r-)}=1$. $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$. $l_h=0, 1, 2, \ldots, M_h-1$. $M_h$ represents a quantity of beam vectors in the horizontal dimension. The quantity of beam vectors in each non-zero sub-matrix in the first-level pre-coding matrix is $M=M_v M_h$. $r=1, 2, \ldots, R$. R represents the quantity of transmission streams.

The structure and operations of a UE according to the embodiment of the disclosure are described below with reference to a hardware structure thereof.

Figure 5:
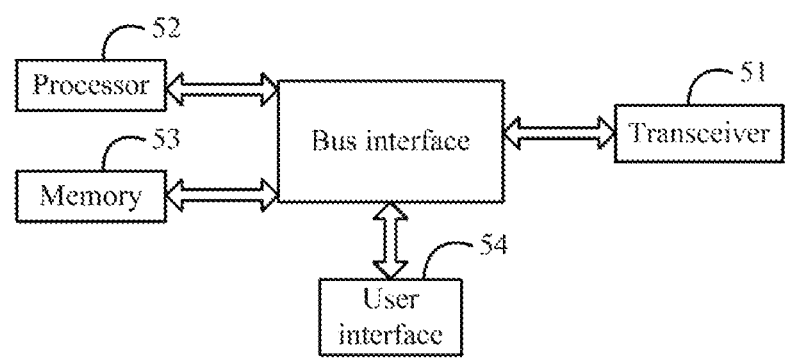
FIG. 5 is a schematic diagram of a UE according to the embodiment of the disclosure.

In the embodiment illustrated by FIG. 5, the UE includes a transceiver 51 and at least one processor 52 connected with the transceiver 51.

The at least one processor 52 is configured to read a program in a memory 53 to perform the following operation: determining first pre-coding indication information and second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of a pre-coding matrix.

The transceiver 51 is configured to be controlled by the at least one processor 52 to transmit the first pre-coding indication information and the second pre-coding indication information to a network side device.

As illustrate by FIG. 5, the bus architecture can include any quantity of interconnected buses and bridges to particularly link together various circuits including one or more processors represented by the at least one processor 52 and one or more memories represented by the memory 53. The bus architecture can further link together various other circuits such as a prophetical device, a manostat, a power management circuit, and etc., which are well known in the art, so a further description thereof is omitted in this context. The bus interface serves as an interface. The transceiver 51 can be a quantity of elements including a transmitter and a receiver, to provide units for communication with various other devices over a transmission medium. For different user equipments, a user interface 54 can also be an interface via which desirable devices can be connected internally or externally, and the connected devices can include but are not be limited to a keypad, a display, a speaker, a microphone, a joystick, and etc.

The at least one processor 52 is responsible for managing the bus architecture and performing normal processing, and the memory 53 can store data for use by the at least one processor 52 when performing the operations.

In an implementation, the at least one processor 52 is further configured to: to perform the following operations: selecting a first-level pre-coding matrix from a set of first-level pre-coding matrixes, and determining the first pre-coding indication information corresponding to the selected first-level pre-coding matrix; selecting a second-level pre-coding matrix from a set of second-level pre-coding matrixes, and determining the second pre-coding indication information corresponding to the selected second-level pre-coding matrix. Each first-level pre-coding matrix is a block diagonal matrix. Each non-zero sub-matrix in each first-level pre-coding matrix represents a different polarization. Each non-zero sub-matrix includes M beam vectors, and M is a positive integer.

The structure and operations of a base station according to an embodiment of the disclosure are described below with reference to a preferable hardware structure thereof.

Figure 6:
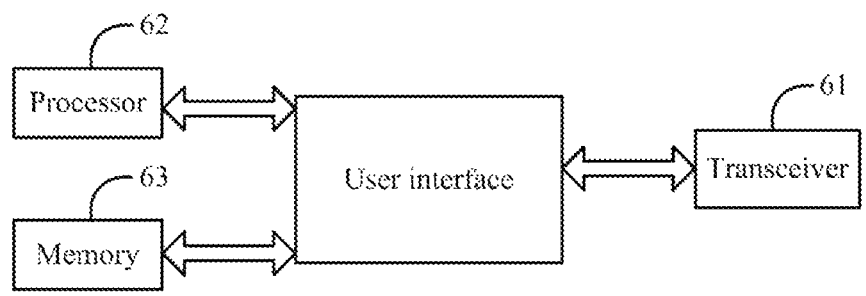
FIG. 6 is a schematic diagram of a base station according to the embodiment of the disclosure.

According to the embodiment illustrated by FIG. 6, The base station includes a transceiver 61 and at least one processor 62 connected with the transceiver 61. The at least one processor 62 is configured to read a program in a memory 63 to perform the following operation: receiving first pre-coding indication information and second pre-coding indication information transmitted by a UE through the transceiver 61; and determining the pre-coding matrix according to the first pre-coding indication information and the second pre-coding indication information. The first pre-coding indication information corresponds to a first-level pre-coding matrix. The first-level pre-coding matrix includes beam vectors having different polarizations. The second pre-coding indication information corresponds to a second-level pre-coding matrix. The second-level pre-coding matrix is configured for weighting amplitudes of and adjusting phases of the beam vectors in the first-level pre-coding matrix. The first-level pre-coding matrix and the second-level pre-coding matrix are configured for generation of the pre-coding matrix.

As illustrate by FIG. 6, the bus architecture can include any quantity of interconnected buses and bridges to particularly link together various circuits including one or more processors represented by the at least one processor 62 and one or more memories represented by the memory 63. The bus architecture can further link together various other circuits such as a prophetical device, a manostat, a power management circuit, and etc., which are well known in the art, so a further description thereof is omitted in this context. The bus interface serves as an interface. The transceiver 61 can be a quantity of elements including a transmitter and a receiver, to provide units for communication with various other devices over a transmission medium. For different user equipments, a user interface 64 can also be an interface via which desirable devices can be connected internally or externally, and the connected devices can include but are not be limited to a keypad, a display, a speaker, a microphone, a joystick, and etc.

The at least one processor 62 is responsible for managing the bus architecture and performing normal processing, and the memory 63 can store data for use by the at least one processor 62 when performing the operations.

In an implementation, the at least one processor is further configured to perform the following operations: determining a first-level pre-coding matrix corresponding to the first pre-coding indication information from a set of first-level pre-coding matrixes; determining a second-level pre-coding matrix corresponding to the second pre-coding indication information from a set of second-level pre-coding matrixes; and determining the pre-coding matrix by multiplying the determined first-level pre-coding matrix and the determined second level pre-coding matrix. Each first-level pre-coding matrix is a block diagonal matrix, each non-zero sub-matrix in each first-level pre-coding matrix represents a different polarization, each non-zero sub-matrix includes M beam vectors, and M is a positive integer.

Those skilled in the art shall appreciate that the embodiment of the disclosure can be embodied as a method, a system or a computer program product. Therefore the disclosure can be embodied in a form of an all-hardware embodiment, an all-software embodiment or an embodiment of software and hardware in combination. Furthermore the disclosure can be embodied in the form of a computer program product in one or more computer useable storage mediums (including but not limited to a disk memory, a CD-ROM, an optical memory, and etc.) in which computer useable program codes are contained.

The disclosure is described with reference to flow charts and/or block diagrams of the methods, the apparatuses (systems) and the computer program product according to the embodiment of the disclosure. It shall be appreciated that each operation and/or block in the flow charts and/or the block diagrams and combinations of the operations and/or the blocks in the flow charts and/or the block diagrams can be implemented by computer program instructions. These computer program instructions can be provided to a processor of a general-purpose computer, a specific-purpose computer, an embedded processor or another programmable data processing device to produce a machine so that the instructions executed by the processor of the computer or the other programmable data processing device create means for performing functions specified in the flow charts and/or the block diagrams.

These computer program instructions can also be stored into a computer readable memory capable of directing the computer or the other programmable data processing device to operate in a specific manner so that the instructions stored in the computer readable memory create an article of manufacture including an instruction means which performs functions specified in the flow charts and/or the block diagrams.

These computer program instructions can also be loaded onto the computer or the other programmable data processing device so that a series of operations are performed by the computer or the other programmable data processing device to create a computer implemented process so that the instructions executed by the computer or the other programmable device provide operations for performing the functions specified in the flow chart and/or the block diagrams.

Although the embodiment of the disclosure has been described, those skilled in the art benefiting from the underlying inventive concept can make additional modifications and variations to the embodiment. Therefore the appended claims are intended to be construed as encompassing the embodiment and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for transmitting pre-coding indication information, the method comprising:

determining, by a user equipment (UE), first pre-coding indication information and second pre-coding indication information, wherein the first pre-coding indication information corresponds to a first-level pre-coding matrix, the first-level pre-coding matrix comprises beam vectors having different polarizations, the second pre-coding indication information corresponds to a second-level pre-coding matrix, the second-level pre-coding matrix is configured for weighting amplitudes of and adjusting phases of the beam vectors in the first-level pre-coding matrix, and the first-level pre-coding matrix and the second-level pre-coding matrix are configured for generation of a pre-coding matrix; and transmitting, by the UE, the first pre-coding indication information and the second pre-coding indication information to a network side device;

wherein determining, by the UE, the first pre-coding indication information and the second pre-coding indication information comprises:

selecting, by the UE, a first-level pre-coding matrix from a set of first-level pre-coding matrixes, and determining the first pre-coding indication information corresponding to the selected first-level pre-coding matrix, wherein each first-level pre-coding matrix is a block diagonal matrix, each non-zero sub-matrix in each first-level pre-coding matrix represents a different polarization, each non-zero sub-matrix comprises M beam vectors, and M is a positive integer; and selecting, by the UE, a second-level pre-coding matrix from a set of second-level pre-coding matrixes, and determining the second pre-coding indication information corresponding to the selected second-level pre-coding matrix;

wherein each second-level pre-coding matrix, $W_2$, in the set of second-level pre-coding matrixes is represented as:

$$W_2 = \begin{bmatrix} a_0^{(1+)}e^{j\theta_0^{(1+)}} & a_0^{(2+)}e^{j\theta_0^{(2+)}} & \cdots & a_0^{(R+)}e^{j\theta_0^{(R+)}} \\ a_1^{(1+)}e^{j\theta_1^{(1+)}} & a_1^{(2+)}e^{j\theta_1^{(2+)}} & \cdots & a_1^{(R+)}e^{j\theta_1^{(R+)}} \\ \vdots & \vdots & \vdots & \vdots \\ a_{M-1}^{(1+)}e^{j\theta_{M-1}^{(1+)}} & a_{M-1}^{(2+)}e^{j\theta_{M-1}^{(2+)}} & \cdots & a_{M-1}^{(R+)}e^{j\theta_{M-1}^{(R+)}} \\ \phi(1)a_0^{(1-)}e^{j\theta_0^{(1-)}} & \phi(2)a_0^{(2-)}e^{j\theta_0^{(2-)}} & \cdots & \phi(R)a_0^{(R-)}e^{j\theta_0^{(R-)}} \\ \phi(1)a_1^{(1-)}e^{j\theta_1^{(1-)}} & \phi(2)a_1^{(2-)}e^{j\theta_1^{(2-)}} & \cdots & \phi(R)a_1^{(R-)}e^{j\theta_1^{(R-)}} \\ \vdots & \vdots & \vdots & \vdots \\ \phi(1)a_{M-1}^{(1-)}e^{j\theta_{M-1}^{(1-)}} & \phi(2)a_{M-1}^{(2-)}e^{j\theta_{M-1}^{(2-)}} & \cdots & \phi(R)a_{M-1}^{(R-)}e^{j\theta_{M-1}^{(R-)}} \end{bmatrix};$$

wherein $\phi(\cdot)$ represents phase adjustment factors of two polarizations; $a_l^{(r+)}$ and $a_l^{(r-)}$ are amplitude weighting factors of an l-th beam vector in each polarization of a first-level pre-coding matrix; $\theta_l^{(r+)}$ and $\theta_l^{(r-)}$ represent phase adjusting factors of an l-th beam vector in each polarization of the first-level pre-coding matrix; l=0, 1, 2, ..., M−1, M represents a quantity of beam vectors in each non-zero sub-matrix in the first-level pre-coding matrix; r=1, 2, ..., R, and R represents a quantity of transmission streams.

2. The method according to claim 1, wherein values of $a_l^{(r+)}$ and $a_l^{(r-)}$ are real values within a range from 0 to 1, and values of $\theta_l^{(r+)}$ and $\theta_l^{(r-)}$ are within a range from −π to π.

3. The method according to claim 2, wherein antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \cdots & A_V^{(R+)} \otimes A_h^{(R+)} \\ \phi(1)\cdot(A_V^{(1-)} \otimes A_h^{(1-)}) & \phi(2)\cdot(A_V^{(2-)} \otimes A_h^{(2-)}) & \cdots & \phi(R)\cdot(A_V^{(R-)} \otimes A_h^{(R-)}) \end{bmatrix};$$

wherein $$A_v^{(r+)} = \begin{bmatrix} a_{v,0}^{(r+)}e^{j\theta_{v,0}^{(r+)}} \\ a_{v,1}^{(r+)}e^{j\theta_{v,1}^{(r+)}} \\ \vdots \\ a_{v,M_v-1}^{(r+)}e^{j\theta_{v,M_v-1}^{(r+)}} \end{bmatrix},$$

$$A_h^{(r+)} = \begin{bmatrix} a_{h,0}^{(r+)}e^{j\theta_{h,0}^{(r+)}} \\ a_{h,1}^{(r+)}e^{j\theta_{h,1}^{(r+)}} \\ \vdots \\ a_{h,M_h-1}^{(r+)}e^{j\theta_{h,M_h-1}^{(r+)}} \end{bmatrix},$$

$$A_v^{(r-)} = \begin{bmatrix} a_{v,0}^{(r-)}e^{j\theta_{v,0}^{(r-)}} \\ a_{v,1}^{(r-)}e^{j\theta_{v,1}^{(r-)}} \\ \vdots \\ a_{v,M_v-1}^{(r-)}e^{j\theta_{v,M_v-1}^{(r-)}} \end{bmatrix} \text{ and}$$

$$A_h^{(r-)} = \begin{bmatrix} a_{h,0}^{(r-)}e^{j\theta_{h,0}^{(r-)}} \\ a_{h,1}^{(r-)}e^{j\theta_{h,1}^{(r-)}} \\ \vdots \\ a_{h,M_h-1}^{(r-)}e^{j\theta_{h,M_h-1}^{(r-)}} \end{bmatrix},$$

wherein $a_{v,l_v}^{(r+)}$ and $a_{v,l_v}^{(r-)}$ represent amplitude weighting factors of an $l_v$-th beam vector in a vertical dimension of each polarization of the first-level pre-coding matrix, values of $a_{v,l_v}^{(r+)}$ and $a_{v,l_v}^{(r-)}$ are real values within a range from 0 to 1 $a_{v,l_v}^{(r+)}$ and $a_{v,l_v}^{(r-)}$; $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix, and values of $\theta_{v,l_v}^{(r+)}$ and $\theta_{v,l_v}^{(r-)}$ are within a range from −π to π, $l_v$=0, 1, 2, ..., $M_v$−1, and $M_v$ represents a quantity of beam vectors in the vertical dimension; $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix, values of $a_{h,l_h}^{(r+)}$ and $a_{h,l_h}^{(r-)}$ are real values within a range from 0 to 1, $a_{h,l_h}^{(r+)}$ and $a_{h,l_h}^{(r-)}$; $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from −π to π, wherein $l_h$=0, 1, 2, ..., $M_h$−1, and $M_h$ represents a quantity of beam vectors in the horizontal dimension; the quantity of beam vectors in each non-zero sub-matrix in the first-level pre-coding matrix is $M=M_vM_h$; r=1, 2, ..., R, and R represents the quantity of transmission streams.

4. A method for determining a pre-coding matrix, the method comprising:
receiving, by a network side device, first pre-coding indication information and second pre-coding indication information transmitted by a user equipment (UE); and
determining, by the network side device, the pre-coding matrix according to the first pre-coding indication information and the second pre-coding indication information;
wherein the first pre-coding indication information corresponds to a first-level pre-coding matrix, the first-level pre-coding matrix comprises beam vectors having different polarizations, the second pre-coding indication information corresponds to a second-level pre-coding matrix, the second-level pre-coding matrix is configured for weighting amplitudes of and adjusting phases of the beam vectors in the first-level pre-coding matrix, and the first-level pre-coding matrix and the second-level pre-coding matrix are configured for generation of the pre-coding matrix;

wherein determining, by the network side device, the pre-coding matrix comprises:

determining, by the network side device, a first-level pre-coding matrix corresponding to the first pre-coding indication information from a set of first-level pre-coding matrixes, wherein each first-level pre-coding matrix is a block diagonal matrix, each non-zero sub-matrix in each first-level pre-coding matrix represents a different polarization, each non-zero sub-matrix comprises M beam vectors, and M is a positive integer;

determining, by the network side device, a second-level pre-coding matrix corresponding to the second pre-coding indication information from a set of second-level pre-coding matrixes; and determining, by the network side device, the pre-coding matrix by multiplying the determined first-level pre-coding matrix and the determined second level pre-coding matrix;

wherein each second-level pre-coding matrix, $W_2$, in the set of second-level pre-coding matrixes is represented as:

$$W_2 = \begin{bmatrix} a_0^{(1+)}e^{j\theta_0^{(1+)}} & a_0^{(2+)}e^{j\theta_0^{(2+)}} & \ldots & a_0^{(R+)}e^{j\theta_0^{(R+)}} \\ a_1^{(1+)}e^{j\theta_1^{(1+)}} & a_1^{(2+)}e^{j\theta_1^{(2+)}} & \ldots & a_1^{(R+)}e^{j\theta_1^{(R+)}} \\ \vdots & \vdots & \vdots & \vdots \\ a_{M-1}^{(1+)}e^{j\theta_{M-1}^{(1+)}} & a_{M-1}^{(2+)}e^{j\theta_{M-1}^{(2+)}} & \ldots & a_{M-1}^{(R+)}e^{j\theta_{M-1}^{(R+)}} \\ \phi(1)a_0^{(1-)}e^{j\theta_0^{(1-)}} & \phi(2)a_0^{(2-)}e^{j\theta_0^{(2-)}} & \ldots & \phi(R)a_0^{(R-)}e^{j\theta_0^{(R-)}} \\ \phi(1)a_1^{(1-)}e^{j\theta_1^{(1-)}} & \phi(2)a_1^{(2-)}e^{j\theta_1^{(2-)}} & \ldots & \phi(R)a_1^{(R-)}e^{j\theta_1^{(R-)}} \\ \vdots & \vdots & \vdots & \vdots \\ \phi(1)a_{M-1}^{(1-)}e^{j\theta_{M-1}^{(1-)}} & \phi(2)a_{M-1}^{(2-)}e^{j\theta_{M-1}^{(2-)}} & \ldots & \phi(R)a_{M-1}^{(R-)}e^{j\theta_{M-1}^{(R-)}} \end{bmatrix};$$

wherein $\phi(\cdot)$ represents phase adjustment factors of two polarizations; $a_l^{(r+)}$ and $a_l^{(r-)}$ are amplitude weighting factors of an l-th beam vector in each polarization of a first-level pre-coding matrix, $\theta_l^{(r+)}$ and $\theta_l^{(r-)}$ represent phase adjusting factors of an l-th beam vector in each polarization of the first-level pre-coding matrix, $l=0, 1, 2, \ldots, M-1$, M represents a quantity of beam vectors in each non-zero sub-matrix in the first-level pre-coding matrix; $r=1, 2, \ldots, R$, and R represents a quantity of transmission streams.

5. The method according to claim 4, wherein values of $a_l^{(r+)}$ and $a_l^{(r-)}$ are real values within a range from 0 to 1, and values of $\theta_l^{(r+)}$ and $\theta_l^{(r-)}$ are within a range from $-\pi$ to $\pi$.

6. The method according to claim 5, wherein antenna ports of the UE are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \ldots & A_V^{(R+)} \otimes A_h^{(R+)} \\ \phi(1) \cdot (A_V^{(1-)} \otimes A_h^{(1-)}) & \phi(2) \cdot (A_V^{(2-)} \otimes A_h^{(2-)}) & \ldots & \phi(R) \cdot (A_V^{(R-)} \otimes A_h^{(R-)}) \end{bmatrix};$$

wherein $$A_v^{(r+)} = \begin{bmatrix} a_{v,0}^{(r+)}e^{j\theta_{v,0}^{(r+)}} \\ a_{v,1}^{(r+)}e^{j\theta_{v,1}^{(r+)}} \\ \vdots \\ a_{v,M_v-1}^{(r+)}e^{j\theta_{v,M_v-1}^{(r+)}} \end{bmatrix},$$

$$A_h^{(r+)} = \begin{bmatrix} a_{h,0}^{(r+)}e^{j\theta_{h,0}^{(r+)}} \\ a_{h,1}^{(r+)}e^{j\theta_{h,1}^{(r+)}} \\ \vdots \\ a_{h,M_h-1}^{(r+)}e^{j\theta_{h,M_h-1}^{(r+)}} \end{bmatrix},$$

$$A_v^{(r-)} = \begin{bmatrix} a_{v,0}^{(r-)}e^{j\theta_{v,0}^{(r-)}} \\ a_{v,1}^{(r-)}e^{j\theta_{v,1}^{(r-)}} \\ \vdots \\ a_{v,M_v-1}^{(r-)}e^{j\theta_{v,M_v-1}^{(r-)}} \end{bmatrix} \text{ and}$$

$$A_h^{(r+)} = \begin{bmatrix} a_{h,0}^{(r-)}e^{j\theta_{h,0}^{(r-)}} \\ a_{h,1}^{(r-)}e^{j\theta_{h,1}^{(r-)}} \\ \vdots \\ a_{h,M_h-1}^{(r-)}e^{j\theta_{h,M_h-1}^{(r-)}} \end{bmatrix},$$

wherein $a_{v,l_v}^{(r+)}$ and $a_{v,l_v}^{(r-)}$ represent amplitude weighting factors of an $l_v$-th beam vector in a vertical dimension of each polarization of the first-level pre-coding matrix, values of $a_{v,l_v}^{(r+)}$ and $a_{v,l_v}^{(r-)}$ are real values within a range from 0 to 1, $\Sigma_{l=0}^{M_v-1}a_{v,l_v}^{(r+)}=1$ and $\Sigma_{l=0}^{M_v-1}a_{v,l_v}^{(r-)}=1$; $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix, and values of $\theta_{v,l_v}^{(r+)}$ and $\theta_{v,l_v}^{(r-)}$ are within a range from $-\pi$ to $\pi$, $l_v=0, 1, 2, \ldots, M_v-1$, and $M_v$ represents a quantity of beam vectors in the vertical dimension; $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix, values of $a_{h,l_h}^{(r+)}$ and $a_{h,l_h}^{(r-)}$ are real values within a range from 0 to 1, $\Sigma_{l=0}^{M_h-1}a_{h,l_h}^{(r+)}=1$ and $\Sigma_{l=0}^{M_h-1}a_{h,l_h}^{(r-)}=1$; and $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from $-\pi$ to $\pi$, wherein $l_h=0, 1, 2, \ldots, M_h-1$, and $M_h$ represents a quantity of beam vectors in the horizontal dimension; the quantity of beam vectors in each non-zero sub-matrix in the first-level pre-coding matrix is $M=M_vM_h$; $r=1, 2, \ldots, R$, and R represents the quantity of transmission streams.

7. An apparatus for transmitting pre-coding indication information, the apparatus comprising:
a transmitter;
a processor; and
a memory storing at least one instruction, wherein the processor is configured to execute the at least one instruction to:
determine first pre-coding indication information and second pre-coding indication information, wherein the first pre-coding indication information corresponds to a first-level pre-coding matrix, the first-level pre-coding matrix comprises beam vectors having different polarizations, the second pre-coding indication information corresponds to a second-level pre-coding matrix, the second-level pre-coding matrix is configured for weighting amplitudes of and adjusting phases of the beam vectors in the first-level pre-coding matrix, and the first-level pre-coding matrix and the second-level pre-coding matrix are configured for generation of a pre-coding matrix; and control the transmitter to transmit the first pre-coding indication information and the second pre-coding indication information to a network side device;

wherein the processor is further configured to execute the at least one instruction to:

select a first-level pre-coding matrix from a set of first-level pre-coding matrixes, and determine the first pre-coding indication information corresponding to the selected first-level pre-coding matrix, wherein each first-level pre-coding matrix is a block diagonal matrix, each non-zero sub-matrix in each first-level pre-coding matrix represents a different polarization, each non-zero sub-matrix comprises M beam vectors, and M is a positive integer; and select a second-level pre-coding matrix from a set of second-level pre-coding matrixes, and determine the second pre-coding indication information corresponding to the selected second-level pre-coding matrix;

wherein each second-level pre-coding matrix, $W_2$, in the set of second-level pre-coding matrixes is represented as:

$$W_2 = \begin{bmatrix} a_0^{(1+)}e^{j\theta_0^{(1+)}} & a_0^{(2+)}e^{j\theta_0^{(2+)}} & \cdots & a_0^{(R+)}e^{j\theta_0^{(R+)}} \\ a_1^{(1+)}e^{j\theta_1^{(1+)}} & a_1^{(2+)}e^{j\theta_1^{(2+)}} & \cdots & a_1^{(R+)}e^{j\theta_1^{(R+)}} \\ \vdots & \vdots & \vdots & \vdots \\ a_{M-1}^{(1+)}e^{j\theta_{M-1}^{(1+)}} & a_{M-1}^{(2+)}e^{j\theta_{M-1}^{(2+)}} & \cdots & a_{M-1}^{(R+)}e^{j\theta_{M-1}^{(R+)}} \\ \phi(1)a_0^{(1-)}e^{j\theta_0^{(1-)}} & \phi(2)a_0^{(2-)}e^{j\theta_0^{(2-)}} & \cdots & \phi(R)a_0^{(R-)}e^{j\theta_0^{(R-)}} \\ \phi(1)a_1^{(1-)}e^{j\theta_1^{(1-)}} & \phi(2)a_1^{(2-)}e^{j\theta_1^{(2-)}} & \cdots & \phi(R)a_1^{(R-)}e^{j\theta_1^{(R-)}} \\ \vdots & \vdots & \vdots & \vdots \\ \phi(1)a_{M-1}^{(1-)}e^{j\theta_{M-1}^{(1-)}} & \phi(2)a_{M-1}^{(2-)}e^{j\theta_{M-1}^{(2-)}} & \cdots & \phi(R)a_{M-1}^{(R-)}e^{j\theta_{M-1}^{(R-)}} \end{bmatrix};$$

wherein $\phi(\cdot)$ represents phase adjustment factors of two polarizations; $a_l^{(r+)}$ and $a_l^{(r-)}$ are amplitude weighting factors of an l-th beam vector in each polarization of a first-level pre-coding matrix; $\theta_l^{(r+)}$ and $\theta_l^{(r-)}$ represent phase adjusting factors of an l-th beam vector in each polarization of the first-level pre-coding matrix, l=0, 1, 2, ..., M−1, M represents a quantity of beam vectors in each non-zero sub-matrix in the first-level pre-coding matrix; r=1, 2, ..., R, and R represents a quantity of transmission streams.

8. The apparatus according to claim 7, wherein values of $a_l^{(r+)}$ and $a_l^{(r-)}$ are real values within a range from 0 to 1, and values of $\theta_l^{(r+)}$ and $\theta_l^{(r-)}$ are within a range from −π to π.

9. The apparatus according to claim 8, wherein antenna ports of the apparatus are two-dimension antenna ports, and each second-level pre-coding matrix $W_2$ in the set of second-level pre-coding matrixes is represented as:

$$W_2 = \begin{bmatrix} A_V^{(1+)} \otimes A_h^{(1+)} & A_V^{(2+)} \otimes A_h^{(2+)} & \cdots & A_V^{(R+)} \otimes A_h^{(R+)} \\ \phi(1)\cdot(A_V^{(1-)} \otimes A_h^{(1-)}) & \phi(2)\cdot(A_V^{(2-)} \otimes A_h^{(2-)}) & \cdots & \phi(R)\cdot(A_V^{(R-)} \otimes A_h^{(R-)}) \end{bmatrix};$$

wherein $$A_v^{(r+)} = \begin{bmatrix} a_{v,0}^{(r+)}e^{j\theta_{v,0}^{(r+)}} \\ a_{v,1}^{(r+)}e^{j\theta_{v,1}^{(r+)}} \\ \vdots \\ a_{v,M_v-1}^{(r+)}e^{j\theta_{v,M_v-1}^{(r+)}} \end{bmatrix},$$

$$A_h^{(r+)} = \begin{bmatrix} a_{h,0}^{(r+)}e^{j\theta_{h,0}^{(r+)}} \\ a_{h,1}^{(r+)}e^{j\theta_{h,1}^{(r+)}} \\ \vdots \\ a_{h,M_h-1}^{(r+)}e^{j\theta_{h,M_h-1}^{(r+)}} \end{bmatrix},$$

$$A_v^{(r-)} = \begin{bmatrix} a_{v,0}^{(r-)}e^{j\theta_{v,0}^{(r-)}} \\ a_{v,1}^{(r-)}e^{j\theta_{v,1}^{(r-)}} \\ \vdots \\ a_{v,M_v-1}^{(r-)}e^{j\theta_{v,M_v-1}^{(r-)}} \end{bmatrix} \text{ and}$$

$$A_h^{(r+)} = \begin{bmatrix} a_{h,0}^{(r-)}e^{j\theta_{h,0}^{(r-)}} \\ a_{h,1}^{(r-)}e^{j\theta_{h,1}^{(r-)}} \\ \vdots \\ a_{h,M_h-1}^{(r-)}e^{j\theta_{h,M_h-1}^{(r-)}} \end{bmatrix},$$

wherein $a_{v,l_v}^{(r+)}$ and $a_{v,l_v}^{(r-)}$ represent amplitude weighting factors of an $l_v$-th beam vector in a vertical dimension of each polarization of the first-level pre-coding matrix, values of $a_{v,l_v}^{(r+)}$ and $a_{v,l_v}^{(r-)}$ are real values within a range from 0 to 1, $\sum_{l=0}^{M_v-1} a_{v,l_v}^{(r+)}=1$ and $\sum_{l=0}^{M_v-1} a_{v,l_v}^{(r-)}=1$; $\theta_{v,l_v}^{(r+)}$ and $\theta_{v,l_v}^{(r-)}$ represent phase adjusting factors of an $l_v$-th beam vector in the vertical dimension of each polarization of the first-level pre-coding matrix, and values of $\theta_{v,l_v}^{(r+)}$ and $\theta_{v,l_v}^{(r-)}$ are within a range from −π to π, $l_v$=0, 1, ..., $M_v$−1, and $M_v$ represents a quantity of beam vectors in the vertical dimension; $a_{h,l_h}^{(r+)}$ and $a_{h,l_h}^{(r-)}$ represent amplitude weighting factors of an $l_h$-th beam vector in a horizontal dimension of each polarization of the first-level pre-coding matrix, values of $a_{h,l_h}^{(r+)}$ and $a_{h,l_h}^{(r-)}$ are real values within a range from 0 to 1, $\sum_{l=0}^{M_h-1} a_{h,l_h}^{(r+)}=1$ and $\sum_{l=0}^{M_h-1} a_{h,l_h}^{(r-)}=1$; $\theta_{h,l_h}^{(r+)}$ and $\theta_{h,l_h}^{(r-)}$ represent phase adjusting factors of an $l_h$-th beam vector in the horizontal dimension of each polarization of the first-level pre-coding matrix, and values of $\theta_{h,l_h}^{(r+)}$ and $\theta_{h,l_h}^{(r-)}$ are within a range from −π to π, wherein $l_h$=0, 1, 2, ..., $M_h$−1, and $M_h$ represents a quantity of beam vectors in the horizontal dimension; the quantity of beam vectors in each non-zero sub-matrix in the first-level pre-coding matrix is $M=M_v M_h$; r=1, 2, ..., R, and R represents the quantity of transmission streams.

* * * * *